United States Patent [19]

Dewald

[11] Patent Number: 4,732,052

[45] Date of Patent: Mar. 22, 1988

[54] LIMITED SLIP DIFFERENTIAL

[75] Inventor: Gregory T. Dewald, South Bend, Ind.

[73] Assignee: Clark Equipment Company, South Bend, Ind.

[21] Appl. No.: 23,584

[22] Filed: Mar. 9, 1987

[51] Int. Cl.[4] .............................................. F16H 1/44
[52] U.S. Cl. .................................... 74/711; 74/710.5
[58] Field of Search .............................. 74/710.5, 711

[56] References Cited

U.S. PATENT DOCUMENTS

| | | | |
|---|---|---|---|
| 2,655,055 | 10/1953 | Bottcher | 74/711 |
| 2,734,398 | 2/1956 | Bottcher | 74/711 |
| 2,949,792 | 8/1960 | Smith | 74/711 |
| 3,229,550 | 1/1960 | Nickell | 74/711 |
| 3,350,961 | 11/1967 | Dodge | 74/711 |
| 3,393,582 | 7/1968 | Muller | 74/711 |
| 3,393,583 | 7/1968 | Mueller | 74/711 |
| 3,546,968 | 12/1970 | Altmann | 74/710.5 |
| 3,831,461 | 8/1974 | Mueller | 74/711 |
| 3,886,813 | 6/1975 | Baremor | 74/710.5 |
| 3,894,446 | 7/1975 | Snoy et al. | 74/711 |
| 4,041,804 | 8/1977 | Clark | 74/711 |
| 4,445,400 | 5/1984 | Sullivan et al. | 74/711 |

Primary Examiner—Dirk Wright
Attorney, Agent, or Firm—Kenneth C. Witt

[57] ABSTRACT

A limited slip differential of the speed sensitive torque biasing type in which a plate type clutch between the case and a side gear is applied jointly by the force of a spring and by the thrust force on the side gear, when the differential is at the stall or low speed condition. As the differential begins to operate and its speed increases the clutch is gradually released by pressurized fluid which is responsive to the speed of rotation, and which releases the clutch by providing a hydrodynamic film on the friction surfaces of the clutch.

18 Claims, 10 Drawing Figures

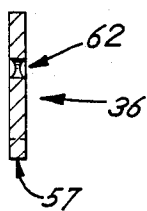
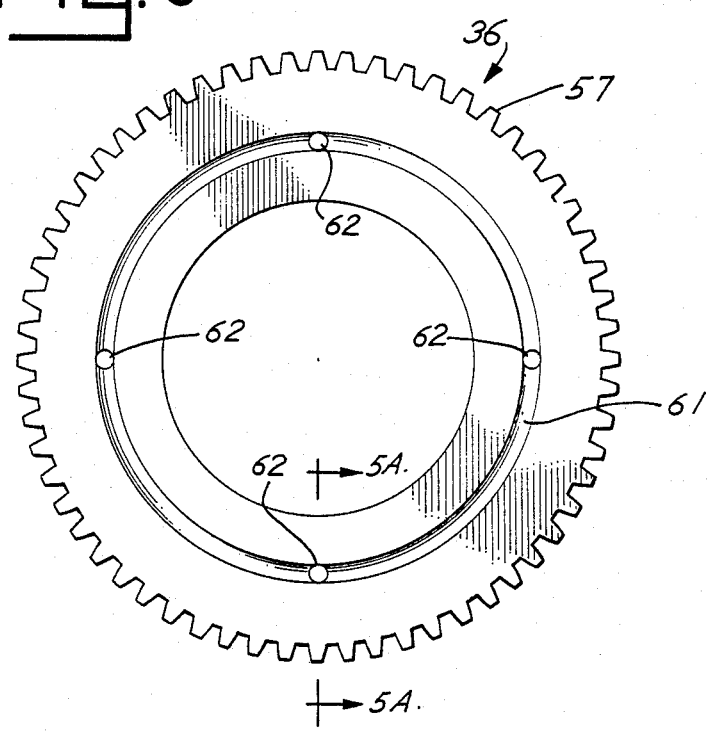
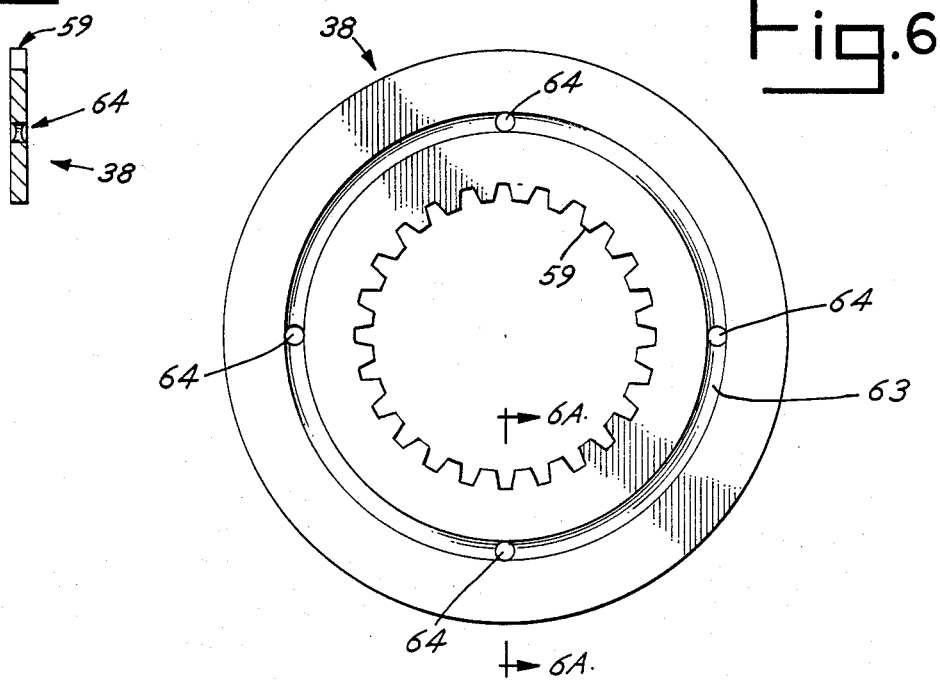

{ 4,732,052 }

LIMITED SLIP DIFFERENTIAL

BACKGROUND OF THE INVENTION

1. Field of the Invention

This invention relates to limited slip differentials and more particularly to a preloaded limited slip differential in which there is a maximum torque bias between the two axle shafts when the differential is at rest or is operating at a low speed.

2. Discussion of the Prior Art

The following U.S. patents show differentials of the limited slip type: U.S. Pat. Nos. 3,546,958 Altmann dated Dec. 15, 1970; 3,886,813 Baremore dated June 3, 1975; and 3,894,446 Snoy et al dated July 15, 1975. These three patents all show preloaded differentials, the first two being automatically preloaded while the third is preloaded upon manual selection by the operator of the vehicle in which it is located.

SUMMARY OF THE INVENTION

In the present invention the differential is preloaded by a friction clutch which is interposed between the case of the differential and one of the side gears. There may be two of such clutches, one on each side of the differential cross-shaft. Each clutch is applied by the joint action of the thrust on the side gear and a flat spring. When the ring gear of the differential is at rest or is operating at a low speed the friction clutch is applied and provides a predetermined torque bias between the two output shafts of the differential. As the speed of rotation of the ring gear increases a source of pressurized fluid, responsive to the rotation of the ring gear, causes the friction clutch to be gradually released until there is no torque bias between the two output shafts at high operating speed.

DESCRIPTION OF THE DRAWING

FIG. 5 shows one of the clutch plates of this invention;

FIG. 5A is a fragmentary sectional view along the line 5A—5A of FIG. 5;

FIG. 6 shows another clutch plate of the invention;

FIG. 6A is a fragmentary sectional view along the line 6A—6A of FIG. 6;

DESCRIPTION OF THE PREFERRED EMBODIMENT

As used herein the term "slip" means the difference in speed between two axle shafts or other shafts with which this invention may be used. When one shaft is rotating and the other is not rotating the slip is at the maximum. When the two shafts are rotating at the same speed there is zero slip. "Limited" as used herein refers to the torque bias or restriction interposed between the two shafts urging both to rotate at the same speed. "Speed sensitive" means that the torque bias between the two shafts varies with the speed of rotation of the differential case, the variation being inverse in this instance.

Figure 1:
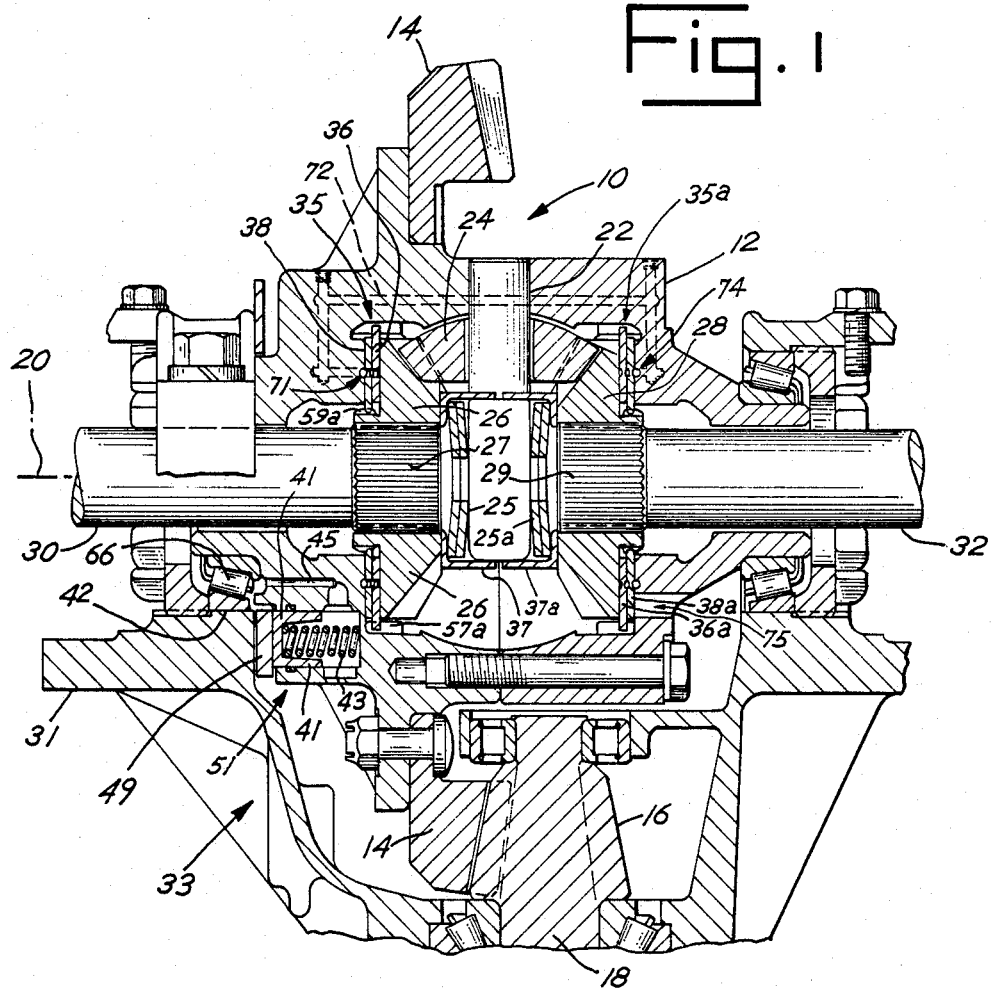
FIG. 1 of the drawing shows a limited slip differential mechanism embodying the present invention.

The differential mechanism of the present invention is indicated generally by the numeral 10 in FIG. 1 of the drawing. Such differential comprises a rotatable case 12, and a ring gear 14 around the periphery of the case. The ring gear is in mesh with and driven by a bevel pinion gear 16 which is carried on a shaft 18. The rotation of shaft 18 produces the rotation of ring gear 14 and case 12 about axis 20. Within the case 12 is at least one cross-shaft or spider 22 upon which there is installed for rotation about cross-shaft 22 at least one bevel pinion gear 24. The bevel gear 24 is in mesh with a pair of side gears 26 and 28. Side gears 26 and 28 in turn are connected to axle shafts 30 and 32 which are connected to wheels at the outer ends of the respective shafts, the connections 27 and 29 between gear 26 and shaft 30 and between gear 28 and shaft 32 respectively being splines or the equivalent. If the vehicle containing this invention is in operation and such operation is straight ahead so that axle shafts 30 and 32 operate at the same speed there is no differential action in differential 10. However, if the speeds of the two axle shafts change because of turning of the vehicle the pinion gear 24 rotates about cross-shaft 22 to provide for a difference in speed between the two axle shafts while continuing to transmit torque to the two axle shafts.

Case 12 and the components within it, along with ring gear 14 and shafts 30 and 32, are contained within a housing 31. As illustrated this invention is embodied in a drive axle assembly which is indicated generally by the numeral 33; however, it will be understood by those skilled in the art that this invention is not limited to such application. For example, it could be used in an interaxle differential assembly.

Figure 2:
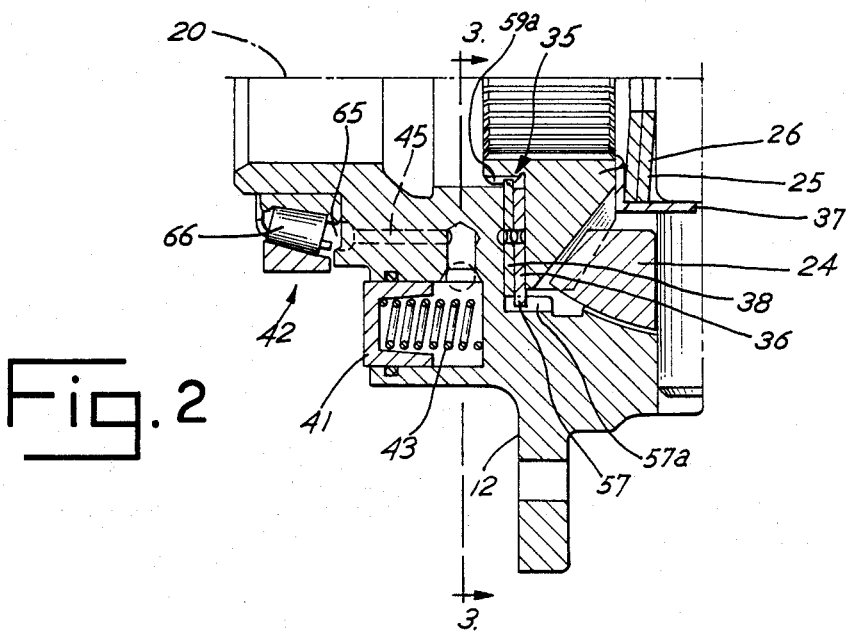
FIG. 2 shows an enlarged fragmentary view of a portion of FIG. 1.

To restrict the differential action between the two shafts 30 and 32 there is provided a plate type friction clutch 35 which can connect the side gear 26 to the differential case 12. Similarly there may be another friction clutch 35a on the other side of cross-shaft 22, which can connect side gear 28 to the differential case 12. Clutch 35 and its operation are illustrated in FIGS. 2-8. In FIG. 2 the numeral 36 indicates a clutch plate splined to the case 12, and 38 indicates a mating clutch plate splined to side gear 26. The clutch 35 operates by pressure urging the two plates into frictional contact with each other. It is known that the combination of a bevel gear such as 24 and meshing side gear such as 26 produces an axially outward thrust, to the left in FIGS. 1 and 2, parallel to centerline 20; this is one force tending to apply clutch 35. There is a flat (Belleville) spring 25 between cross-shaft 22 and gear 26 and this spring is arranged so that it likewise exerts a force outwardly or to the left on plates 36 and 38; this also tends to apply clutch 35. Thus at zero speed or a low ring gear speed the axial thrust of the meshing gear teeth and the Belleville spring combine to load the clutch 35 by urging the friction plates 36,38 together, resulting in the high torque bias normally associated with preloaded limited slip differentials. A retainer 37 may be provided for spring 25.

Friction clutch 35a as seen in FIG. 1 has friction plates 36a and 38a corresponding to 36 and 38 of clutch 35. They operate in the same manner as and in unison with clutch 35. They are subject to combined forces from the thrust on the side gear 28 and the force of flat spring 25a. Clutch 35a is released in unison with clutch 35 by hydraulic fluid from pump 47 as described later. A retainer 37a may be provided for spring 25a.

Figure 4:
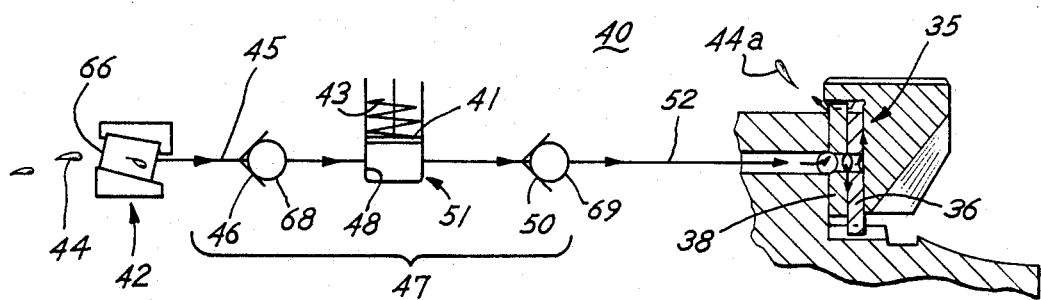
FIG. 4 shows a schematic diagram of some of the principal elements of this invention.

It is desired to gradually reduce the torque bias as the speed of ring gear 14 increases and this is accomplished by the hydraulic circuit and components of this invention. Hydraulic fluid is supplied to the clutches 35 and 35a in sufficient quantity and pressure to reduce the frictional forces between the two sets of clutch plates and consequently the clutch loading and torque bias, by providing a hydrodynamic film on the friction surfaces of the clutches. FIG. 4 illustrates diagrammatically elements of the hydraulic circuit which is indicated generally by the numeral 40. The first element of the hydraulic circuit is a tapered roller bearing assembly 42 which acts as a charging pump, receiving fluid 44 from a reservoir (the housing 31) and transmitting it to a plunger type pump 47; bearing 42 provides a dynamic connection between axle shaft 30 and the housing 31 of drive axle assembly 33. Pump 47 comprises a check valve 46, and a reciprocating piston 41 in a bore chamber 48 which transmits the fluid through check valve 50 and conduit 52 to clutch 35 as shown in FIG. 4 and on to the clutch 35a. The pressurized fluid separates the clutch plates with a fluid film which causes them to gradually release to provide substantially friction-free differential action of the differential 10 at high speed.

The tapered roller bearing assembly 42 which provides a dynamic connection between the axle shaft 30 and the housing 31 is illustrated in both FIGS. 1 and 2 and, as stated previously, such bearing assembly acts as a charging pump to move the fluid through passage 45 to check valve 46 which forms a part of a hydraulic pump 47. From there it goes to plunger portion 51 of the pump which in this instance comprises an undulating face cam portion 49—see FIG. 1—on the inner end of housing 31, piston 41 and a spring 43 which urges the piston against the cam 49. As the piston 41 rotates with the case 12 the piston 41 moves inwardly and outwardly in response to the undulating surface of the cam 49. Such action pumps fluid through the outlet check valve 50 into the conduit 52. From there it is forced between and around the two clutch plates 36 and 38, isolating them by a lubricating hydrodynamic film which causes them to operate essentially friction free.

FIG. 5 shows a configuration which may be used for the clutch plate 36 which is connected to case 12 while FIG. 6 shows a clutch plate 38 which is connected to side gear 26. Plate 36 has external splines 57 which mate with internal splines 57a on the case 12 while plate 38 has internal splines 59 which mate with external splines 59a on the side gear 26. See FIG. 2 for splines 57a and 59a. Plate 36 has an annular groove 61 on each side and feeder holes 62 through the plate 36 which join said grooves; see FIGS. 5 and 5A. Plate 38 has an annular groove 63 on each side and feeder holes 64 join the grooves 63; see FIGS. 6 and 6A.

When pressurized fluid is applied to the first clutch comprising plates 36 and 38 it flows between and around them, mainly through the grooves 61 and 63 and holes 62 and 64, and then flows to clutch 35a. The fluid is discharged from clutch 35 at location 71, and from there flows through a passageway 72 which may be formed by several bores in the case 12. From passageway 72 the pressurized fluid enters clutch 35a at 74. It flows through and around the clutch plates 36a and 38a, particularly through grooves 61,63 and holes 62,64, and is discharged at 75; the holes 61,63 and 62,64 in clutch plates 36a and 38a are the same as in the clutch plates of FIGS. 5 and 6.

Figure 3:
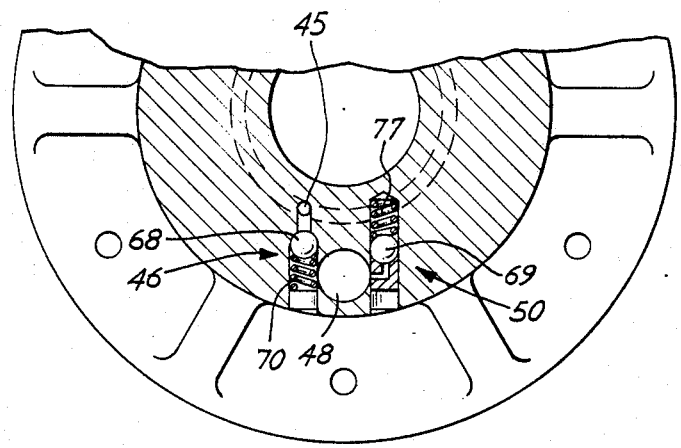
FIG. 3 shows a fragmentary sectional view along the line 3—3 of FIG. 2.
Figure 7:
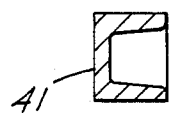
FIG. 7 is a sectional view of a piston forming part of a pump.
Figure 8:
FIG. 8 is an end view of the piston.

FIGS. 1–3 show details of the pump 47 and its components and related parts. There is an annular fluid inlet port 65 adjacent the inner ends of rollers 66 of bearing assembly 42; see FIG. 2. From port 65 there is a longitudinal passage 45 to valve 47 which comprises a ball check 68 that is normally held closed by spring 70; see FIG. 3. Fluid pressure in passage 45 causes ball check 68 to be unseated and fluid admitted to the chamber 48. Piston 41, in chamber 48, is loaded by spring 43. The rotation of case 12 causes oscillation of piston 41 which forces fluid past ball check 69 against the force of spring 77. As shown in FIG. 3 the two ball checks 68 and 69 are transverse to the axis 20 of the shafts 30 and 32 while the axis of piston 41 in chamber 48 is parallel to the axis of the shafts. FIGS. 7 and 8 show respectively a sectional view and an end view of the piston 41.

During operation at low speed the thrust of the bevel gear 24 on side gear 26 plus the force of flat spring 25 cause the clutch 35 to be locked up. Similarly, the thrust of bevel gear 24 on side gear 28 plus the force of flat spring 25a cause clutch 35a to be locked up. As the speed of the vehicle increases the flow of fluid from pump 47 over and through clutch plates 36 and 38 and then clutch plates 36a and 38a causes the clutches gradually to release and allow unrestricted operation of the differential. Thus there is provided a preloaded speed sensitive limited slip differential.

While I have described and illustrated herein a preferred embodiment of my invention and the best mode contemplated for carrying it out it will be appreciated that modifications may be made. For example, in some applications of this invention only one clutch may be required instead of two as disclosed herein. Accordingly, it should be understood that I intend to cover by the appended claims all such modifications falling within the true spirit and scope of my invention.

I claim:

1. A limited slip differential having a case rotatable about an axis, a ring gear on the case for rotating the case, the case having an internal cross-shaft, a bevel pinion gear rotatable about the cross-shaft, a pair of coaxial shafts extending inwardly into the opposite ends of the case respectively, and each shaft carrying a bevel side gear which is in mesh with the pinion gear, the differential comprising
   a friction clutch for clutching together one side gear and said case for limiting differential action between said axle shafts,
   a hydraulic pump operated by rotation of the differential case,
   said pump receiving hydraulic fluid through an antifriction bearing, and
   a conduit connecting said pump and said clutch for forcing fluid through the clutch thereby gradually releasing the clutch as the speed of said case increases.

2. A limited slip differential as in claim 1 wherein said antifriction bearing is a tapered roller bearing.

3. A limited slip differential as in claim 2 wherein said tapered roller bearing dynamically connects said housing and said case.

4. A limited slip differential as in claim 1 wherein said pump is a plunger type pump.

5. A limited slip differential as in claim 1 wherein the differential is within a housing and said pump comprises an annular undulating cam surface on said housing, a piston carried by said case, and a spring urging said piston into contact with said cam surface.

6. A limited slip differential as in claim 1 wherein said clutch includes a plurality of friction plates.

7. A limited slip differential as in claim 1 which includes a flat spring between said cross-shaft and said one side gear for aiding in the application of said clutch.

8. A limited slip differential as in claim 1 wherein there are dual means for applying said clutch.

9. A limited slip differential as in claim 8 wherein one of said dual means is the thrust resulting from the meshing of said bevel pinion gear and said one side gear.

10. A limited slip differential as in claim 8 wherein one of said dual means is a flat spring.

11. A limited slip differential as in claim 8 wherein one of said dual means is the thrust resulting from the meshing of said bevel pinion gear and said one side gear, and the other of said dual means is a flat spring located between said cross-shaft and said one side gear.

12. A limited slip differential as in claim 1 which includes a second friction clutch for clutching together the other said side gear and said case, for assisting in limiting differential action between said axle shafts.

13. A limited slip differential mechanism having two coaxial output shafts, differential gears between said shafts for connecting the shafts for joint operation, a rotatable case housing the differential gears, and a friction plate clutch for clutching one of said gears to the case for operating said shafts in unison, comprising
a tapered roller bearing dynamically connected to said case,
said bearing discharging fluid when said case is rotating,
a plunger pump which receives the fluid discharged from said bearing,
said plunger pump including a piston which reciprocates responsively to the rotation of said case,
said pump discharging fluid through an outlet which directs said fluid onto a plate of said friction clutch, whereby said fluid provides a hydrodynamic film on said friction plate cluch mechanism,
reducing the effectiveness of said clutch and the restriction on the slip of the differential.

14. A limited slip differential mechanism as in claim 13 wherein said plunger pump comprises a first ball check which admits fluid into a chamber housing said piston, and a second ball check which provides for discharge of fluid from said chamber.

15. A method for operating a limited slip differential having a case member rotatable about an axis, a ring gear on the case for rotating the case, the case having an internal cross-shaft, a bevel pinion gear rotatable on the cross-shaft, a pair of coaxial shafts extending inwardly into the opposite ends of the case respectively, and each coaxial shaft carrying a side gear which is in mesh with the pinion gear, the method comprising
providing a clutch having at least one friction plate for clutching together one of said side gears and said case for restricting differential action between said coaxial shafts,
providing a hydraulic pump operated by rotation of said case,
providing an antifriction bearing connected to said case which acts to charge said pump,
directing fluid from said bearing to said pump; and
providing a conduit connecting said pump and said plate clutch for forcing fluid through the clutch and over said friction plate,
thereby gradually releasing the clutch as the speed of said case increases.

16. A method as in claim 15 which includes the step of arranging the meshng engagement of said pinion gear and a side gear so as to provide an axial thrust urging said clutch toward the applied condition.

17. A method as in claim 16 which includes the step of arranging a flat spring between said cross-shaft and one of said coaxial shafts to provide an axial thrust urging said clutch toward the applied condition.

18. A method as in claim 15 which includes the step of arranging the meshing engagement of said pinion gear and a bevel side gear so as to provide an axial thrust urging said clutch toward the engaged condition, and the further step of arranging a flat spring between said cross-shaft and one of said coaxial shafts to provide an additional axial thrust urging said clucth toward the applied condition.

* * * * *